United States Patent
Espinasse

(10) Patent No.: US 9,598,052 B2
(45) Date of Patent: Mar. 21, 2017

(54) DEVICE FOR SECURING A BLADE ON A WIPER

(75) Inventor: Philippe Espinasse, Coudes (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 753 days.

(21) Appl. No.: 13/821,242

(22) PCT Filed: Aug. 3, 2011

(86) PCT No.: PCT/EP2011/063396
§ 371 (c)(1),
(2), (4) Date: May 1, 2013

(87) PCT Pub. No.: WO2012/031838
PCT Pub. Date: Mar. 15, 2012

(65) Prior Publication Data
US 2013/0205531 A1   Aug. 15, 2013

(30) Foreign Application Priority Data

Sep. 9, 2010 (FR) ...................... 10 03596

(51) Int. Cl.
*B60S 1/38* (2006.01)
*B60S 1/52* (2006.01)

(52) U.S. Cl.
CPC .............. *B60S 1/38* (2013.01); *B60S 1/3891* (2013.01); *B60S 1/524* (2013.01); *B60S 1/3881* (2013.01); *B60S 1/3886* (2013.01); *B60S 1/3887* (2013.01)

(58) Field of Classification Search
CPC ...... B60S 1/381; B60S 1/3886; B60S 1/3887; B60S 1/3889; B60S 1/3891

USPC .......................... 15/250.201, 250.32, 250.43
See application file for complete search history.

(56) References Cited

U.S. PATENT DOCUMENTS

| | | | |
|---|---|---|---|
| 5,933,910 A * | 8/1999 | Buechele et al. | 15/250.454 |
| 7,581,280 B2 * | 9/2009 | Op't Roodt et al. | 15/250.43 |
| 8,544,139 B2 * | 10/2013 | Chien | 15/250.44 |
| 2006/0107485 A1 * | 5/2006 | Kim | 15/250.201 |
| 2008/0289134 A1 * | 11/2008 | Boussicot et al. | 15/250.32 |
| 2010/0107353 A1 * | 5/2010 | Boland | 15/250.32 |

FOREIGN PATENT DOCUMENTS

| | | | | |
|---|---|---|---|---|
| DE | 10000373 A1 | 8/2001 | | |
| EP | 2106979 A1 * | 10/2009 | | B60S 1/38 |
| FR | 2905650 A1 * | 3/2008 | | |
| FR | 2 920 729 A1 | 3/2009 | | |
| JP | 2007216735 A * | 8/2007 | | |

OTHER PUBLICATIONS

International Search Report issued in PCT/EP2011/063396 mailed Oct. 10, 2011 (4 pages).

* cited by examiner

*Primary Examiner* — Michael Jennings
(74) *Attorney, Agent, or Firm* — Osha Liang LLP

(57) ABSTRACT

The invention relates to a securing device (11) provided between a blade (1) and a mounting (4) constituting a wiper, wherein said device includes a first portion (12) that can be attached onto the mounting (4) and a second portion (13) that can be attached onto the blade (1), the first portion (12) and the second portion (13) being connected together by a removable attachment means, characterized in that the first portion (12) includes at least one blocking means capable of plugging at least one liquid-feeding device (6) which is a component of the wiper. The invention can be used for motor vehicles.

9 Claims, 4 Drawing Sheets

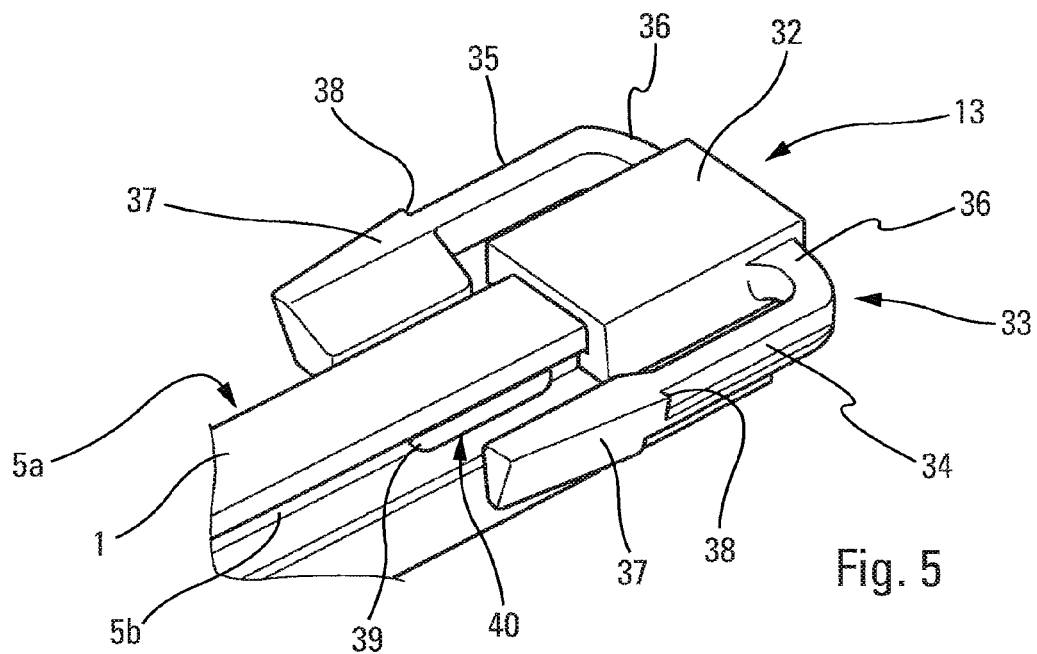
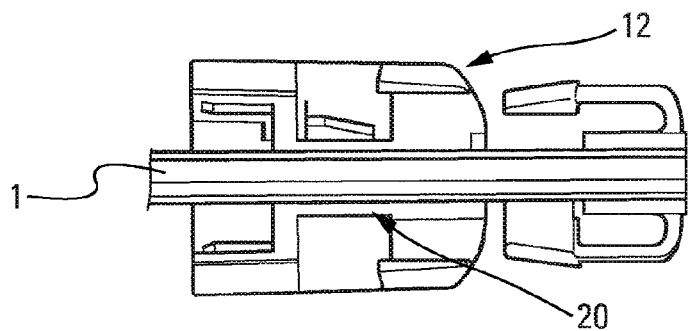
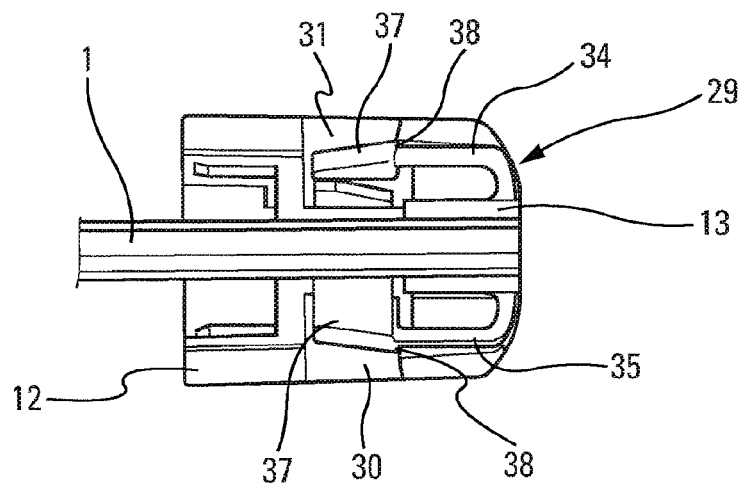

DEVICE FOR SECURING A BLADE ON A WIPER

The field of the present invention is that of equipment for vehicles, and more particularly that of equipment for wiping the windscreens of motor vehicles.

Motor vehicles are commonly equipped with windscreen wiper systems to ensure washing of the windscreen, and to prevent the driver's view of his environment being disrupted. These windscreen wipers are conventionally driven by an arm which performs an angular to and from movement, and they comprise elongate wipers which themselves support scraper blades made of a resilient material. These blades rub against the windscreen and expel water by taking it outside the field of vision of the driver. The wipers are made either, in a conventional version, in the form of articulated stirrup pieces which hold the scraper blade in a plurality of discrete locations, or, in a more recent version known as "flat blade", in the form of a semi-rigid assembly which retains the scraper blade along its entire length. In both solutions, the wiper is attached to the rotary arm of the windscreen wiper by an assembly constituted by a connector and an adapter.

In the case when the quality of the wiping deteriorates, it then becomes necessary to restore the wiping means. Two solutions exist: the first consists of replacement of the entire wiper by a new wiper, whereas the second solution consists of replacement of the scraper blade, whilst retaining the remainder of the wiper.

The invention concerns more particularly this second solution, which requires dismantling of one end of the wiper in order to access the scraper blade.

In addition, windscreen wipers are also equipped with devices for supplying a windscreen-washer liquid, which is conveyed from a tank situated on the vehicle and is sprayed in the direction of the windscreen by nozzles which are situated either around the windscreen, or on the windscreen wiper itself, for better distribution of the liquid.

The disadvantage of this second situation in the case when only the scraper blade is replaced consists in the fact that the device for supply of liquid is open and thus gives rise to leakage.

Another disadvantage of a situation of this type lies in the difficulty of replacing a scraper blade of this type. In fact, it is necessary to obtain the most ergonomic solution possible for replacement of the blade, and it will be appreciated that the presence of a liquid at the level of the handling area complicates the replacement of the blade and the satisfactory refitting of it. In addition, the residual pressure inside the device for supply of liquid can give rise to projections of liquid onto the user, and it is desirable to avoid this.

The object of the present invention is thus to eliminate the above-described disadvantages, mainly by blocking the device for supply of liquid, whilst permitting easy dismantling of the scraper blade relative to the support of the wiper.

The subject of the invention is thus a device for securing between a blade and a support which constitute a wiper, comprising a first part which can be attached on the support, and a second part which can be attached on the blade, the first part and the second part being connected by a removable attachment means, characterized in that the first part comprises at least one blocking means which can plug at least one liquid-feeding device which the wiper comprises.

According to a first feature of the invention, the blade and the support extend according to a longitudinal axis of the wiper, the liquid-feeding device being constituted by two ducts arranged on both sides of the support.

According to a second feature of the invention, the ducts are formed integrally with an air deflector.

According to another feature of the invention, the first part comprises a receptacle which receives an end of the liquid-feeding device.

According to another feature of the invention, the blocking means comprises a stud which penetrates inside the liquid-feeding device, advantageously inside the ducts, in order to plug it.

According to another feature of the invention, the first part comprises a means for locking this first part on the support.

Advantageously, the second part comprises a body which is integral with the blade, for example by threading the blade in, the removable attachment means being constituted by two flexible arms which originate on the body, laterally or at the end relative to the second part, and at the end of which a means for retention on the first part is formed. These flexible arms thus extend in a plane parallel to the plane formed by the support.

Also advantageously, at least one arm has a protuberance which is accommodated in a hole provided in the blade.

According to a first feature of the invention, the first part comprises two lateral deformations, with which each means for retention co-operates.

According to a second feature of the invention, the removable attachment means is formed by at least one flexible finger which extends from the end of the first part and co-operates with a ridge provided in the second part.

The invention also covers a wiper comprising a blade and a support, and wherein the blade is secured on the support by a device according to any one of the features described above.

A first advantage according to the invention lies in the possibility of replacing the blade of the wiper without opening the circuit for supply of windscreen-washer liquid.

Another significant advantage lies in the fact that a replacement of this type is particularly simple to carry out, since the second part, which is connected to the blade, can be extracted from the first part without the presence of liquid which may complicate this extraction. In addition, the blade is replaced in a dry environment, which prevents any projection of liquid onto the user at the time of fitting and dismantling of the blade.

Other features, details and advantages of the invention will become more apparent from reading the following description given by way of example and with reference to the drawings, in which:

FIG. 5 is a view in perspective of the second part of the device according to the invention;

FIG. 6 is a bottom view illustrating a phase of approach of the second part toward the first part of the device according to the invention;

FIG. 7 is a bottom view illustrating a phase of securing the second part in the first part of the device according to the invention;

It should be noted that the figures show the invention in a detailed manner for implementation of the invention, and it will be appreciated that said figures can be used to define the invention better if applicable.

Figure 1:
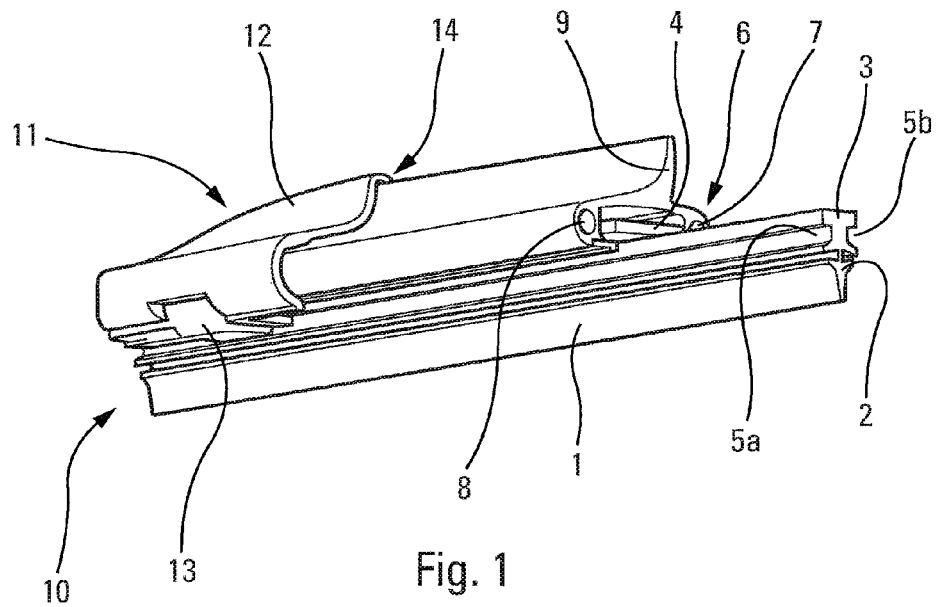
FIG. 1 is a view in perspective of an end of a wiper equipped with the device according to the invention.

FIG. 1 shows in a partial manner a wiper which equips a wiper system fitted on a motor vehicle. This wiper is installed on the front windscreen, but it can also be fitted on the rear window of the vehicle.

This wiper extends along the length according to a longitudinal axis. The wiper comprises a blade 1 constituted by an area of friction 2 on the glass, and by an attachment area 3 which ensures the mechanical connection with a support 4 which the wiper comprises.

This support is also known as a vertebra, and it ensures the mechanical retention of the different components which constitute the wiper. By way of example, it consists of a single metal rod which extends according to the longitudinal axis and which, at rest, has a convex curvature relative to the windscreen. This rod has a particular flexibility, such that, as it is deformed when the wiper is applied to the windscreen, it gives rise to a force which is distributed along the wiper.

The area of attachment 3 comprises two grooves 5a and 5b provided in lateral panels of the area of attachment 3. These two grooves co-operate with claws (not represented) which are integral with or obtained from the support 4, such as to retain the blade against the support, whilst permitting translation of this blade 1 relative to the support 4.

The wiper is provided with a liquid-feeding device 6 which is rendered integral with the support 4, for example by being clipped on, glued, or more generally by co-operation of forms. The device for feeding the liquid is in particular in the form of at least two ducts 7 and 8 which extend longitudinally along the wiper. More specifically, these ducts 7 and 8 are arranged on the sides of the support 4 and in the extension of the plane on which the support 4 extends. This liquid-feeding device 6 is made of a flexible material, for example a rubber or an elastomer.

This liquid-feeding device 6 can be formed jointly with an air deflector 9, the function of which is to increase the force of support of the wiper on the windscreen, to the advantage of the aerodynamic effect of the air. In this embodiment, the air deflector 9 and the feeding device 6, particularly the two ducts 7 and 8, are molded from a single flexible material such as a rubber or an elastomer. The air deflector 9 and the feeding device 6 thus form a single integral part.

At the end 10 of the wiper there is installed a device 11 for securing between the blade 1 and the support 4. Securing in this case indicates a means for blocking the translation of the blade 1 relative to the support 4. Thus, once the device for securing is in place, any movement in translation of the blade is prevented, thus guaranteeing perfect attachment of the latter relative to the remainder of the wiper.

The device 11 for securing comprises a first part 12 and a second part 13 which are connected mechanically to one another by a removable means for attachment or securing. The first part 12 has a cross section which is globally complementary to the cross section of the support 4, of the feeding device 6 and of the deflector 9. Thus, these three components penetrate into a receptacle 14 which is provided in the first part 12.

Figure 2:
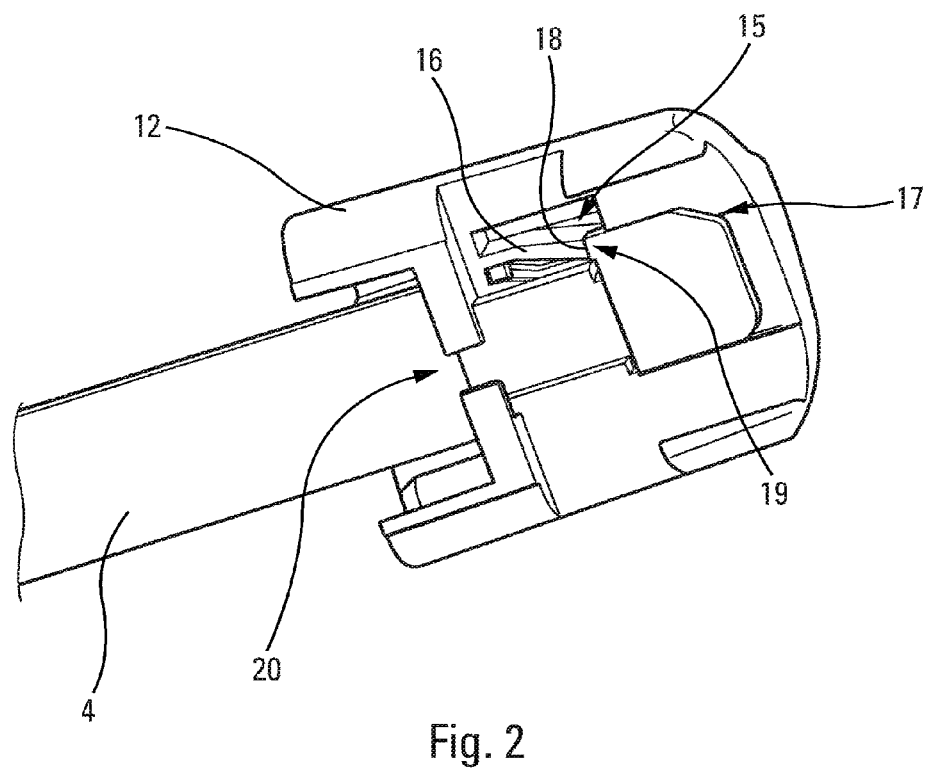
FIG. 2 is a bottom view illustrating the device according to the invention and the support of the wiper.

FIG. 2 shows the manner in which the first part 12 is attached on the support 4. For this purpose, the first part 12 comprises a means 15 for locking the first part on the support 4. This locking means is in particular in the form of a tongue 16 provided on the periphery of a cavity 17 which receives an end of the support 4. This cavity 17 is formed in the inner volume of the first part 12 and has a form complementary to the form of the end of the rod or vertebra which forms the support. In practice, this cavity forms a rectangle in which the end of the support slides. The tongue 16 is formed integrally with the first part 12 and extends according to a plane which intersects the cavity 17. In other words, an end 18 of the tongue extends in the volume delimited by the cavity 17. It will be noted that this tongue 16 is flexible, such as to be deformed in order to allow the end of the support 4 to pass when this end is inserted in the cavity 17. The tongue 16 co-operates with a notch 19 provided in the side of the end of the support. Once the tongue 16 is in place in the notch 19, the end 18 forms a stop against a section of the notch, such as to attach the first part 12 mechanically on the support 4.

The first part 12 also comprises an area 20 for receiving the blade. This receiving area 20 is formed in particular by two flattened parts which delimit an area of passage of the grooves 5a and 5b in the blade.

Figure 3:
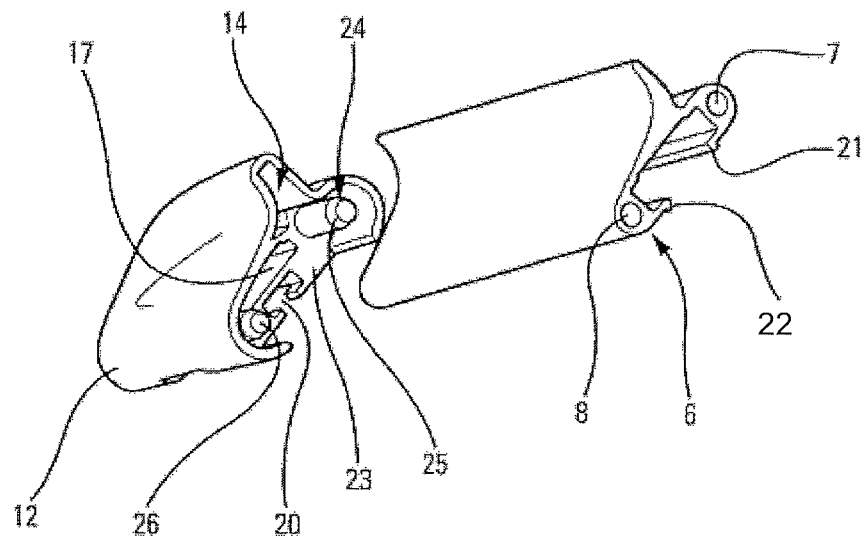
FIG. 3 is an exploded view of the device according to the invention and of the device for feeding the liquid.

FIG. 3 shows, in an exploded view, the first part 12 of the device according to the invention, and the liquid-feeding device 6. The part which assembles the two ducts 7 and 8 with the air deflector 9 has two edges 21 and 22 for retention of the part on the support. Each retention edge has the function of gripping the support 4 in order to ensure the mechanical connection between the part and support.

The retention edge(s) 21 and 22 is/are molded in the same material and at the same time as molding takes place of the liquid-feeding device 6 and the air deflector 9. These retention edges 21 and 22 extend parallel to the support plane, in a direction opposite to one another. These retention edges originate on the length of each duct 7 and 8.

The first part 12 contains the receptacle 14 delimited by the outer wall of the first part. This receptacle 14 has a base 23 which forms a stop for the introduction of the device for feeding of the liquid. The cavity 17 and the receiving area 20 originate on this base 23.

An example of a blocking means 24 according to the invention is represented in this figure. This blocking means 24 has the function of plugging or stopping the device 6 for feeding of the liquid. For this purpose, the first part comprises a stud 25 and 26 opposite each duct 7 and 8. These studs are tubular protuberances which extend according to an axis which is parallel to the longitudinal axis of the wiper and is coincident with the axis on which the duct concerned extends. The outer diameter of these studs is slightly larger than the inner diameter of the respective duct. Since the material which constitutes the ducts 7 and 8 is flexible, the latter are deformed in order to fit on the studs 25 or 26, and thus guarantee sealing against the liquid. Finally, it will be noted that the free end of each stud 25 and 26 has a chamfer which facilitates the introduction of the stud in the duct.

The blocking means 24 can have other embodiments, provided that it ensures the sealing of the liquid-feeding device at the ends of the wiper. By way of example, the blocking means can be formed by flat support of the end of the ducts 7 or 8 directly against the base 23.

Figure 4:
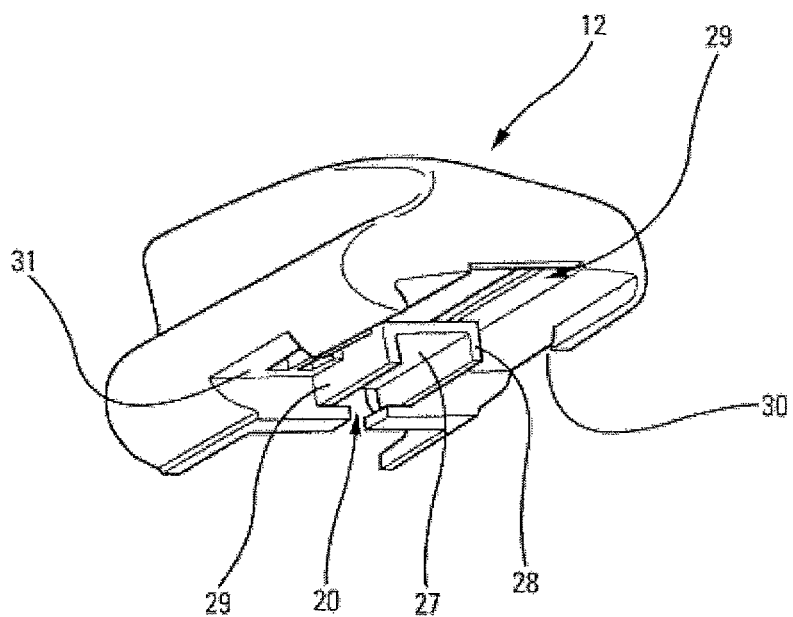
FIG. 4 is a view in perspective of the first part of the device according to the invention.

FIG. 4 shows the underneath of the first part 12 which constitutes the device for securing according to the invention. It will be noted that the area of receipt 20 of the blade extends according to the longitudinal axis by means of a wall 27 which is edged on each side by a lateral panel 28 or 29. This wall 27 and the lateral panels 28 and 29 thus block lateral travel of the blade when the latter is threaded into the receiving area 20.

The lower part of the first part 12 comprises a cutout 29 which acts as a region for accommodation of the second part of the device for securing according to the invention. In other words, the second part is inserted in the cutout 29, such as to be incorporated in the volume of the first part 12 and not to extend from the latter.

The cutout 29 is completed by two lateral deformations 30 and 31, with which the second part co-operates, such as to be blocked in translation relative to the first part 12.

FIG. 5 shows in detail an embodiment of the second part 13. This second part 13 comprises a body 32 in or on which the blade 1 is threaded or fitted. This mechanical connection is created by means of a recess which is provided in the body 12 and is edged laterally by two ribs, which each co-operate with a groove 5a or 5b in the blade 1. The form of the recess is thus complementary to the area of attachment 3 of the blade 1.

The removable attachment means 33 is produced on the second part 13. This attachment means is described as removable in the sense that it can be operated manually by the user in order to attach or extract the second part 13 relative to the first part 12. This removable attachment means comprises two flexible arms 34 and 35 which each originate laterally on the body 32. It will thus be understood that these arms extend according to a plane which is parallel to the plane on which the support 4 extends. Each arm comprises a first portion 36 which extends perpendicularly to the longitudinal axis, then a second portion 37 connected to the first portion 36, which extends parallel to the longitudinal axis. The second portion 37 thus extends according to a direction perpendicular to the direction of extension of the first portion 36.

The free end of each arm 34 and 35 comprises a means for retention 37 which has a ridge 38. Each means for retention 37 co-operates with the lateral deformation 30 or 31 provided in the first part of the device. The ridge 38 thus forms a stop which retains the second part 13 relative to the first part 12, such as to render the second part integral with the first part.

The end of at least one of the arms 34 or 35 comprises a protuberance 39 which is accommodated in a hole 40 provided in the blade. The protuberance 39 is for example formed by a flattened part which originates on a means for retention 37. This flattened part extends on a plane parallel to the plane of extension of the support and penetrates in to the hole 40. The latter is provided in the plane of the two grooves 5a and 5b. This co-operation between the protuberance 39 and the hole 40 connects the second part 13 mechanically to the blade 1.

FIG. 6 shows a phase of insertion or extraction of the blade 1 in the wiper, and more particularly in the first part 12. The blade 1, equipped with the second part 13 of the device according to the invention, slides in the receiving area 20 of the first part 12. At this stage, the blade 1 is not rendered integral with the wiper, and the movement of translation between the blade 1 and the first part 12 is free.

FIG. 7 illustrates the device for securing according to the invention in a state in which the second part 13 is rendered integral with the first part 12 by the removable attachment means 33. The means for retention 37 formed on each arm 34 and 35 co-operates with the lateral deformation 30 or 31 formed on the sides of the first part 12. Since the arms 34 and 35 are formed such as to permit displacement of the means for retention 37, the latter are displaced in the direction of the blade 1 during the introduction of the second part 13 in the first part 12. It is found that the lateral deformations 30 and 31 provide a clearance space in the plane of the support and in the direction of the blade 1 in order to permit the movement of the means for retention 37. For their part, the arms 34 and 35 are accommodated integrally in the cutout 29, such that the second part 13 is mostly concealed by the first part 12.

If the user wishes to replace the blade 1, he presses the two means for retention 37 in the direction of the blade, so as to release the ridge 38 of the lateral deformation 30 or 31 concerned. The translation of the second part 13 relative to the first part 12 is thus enabled, and the movement of extraction of the blade can be engaged by pulling on the second part 13, the latter drawing with it the blade 1 by means of the co-operation of the protuberance 39 with the hole 40.

Figure 8:
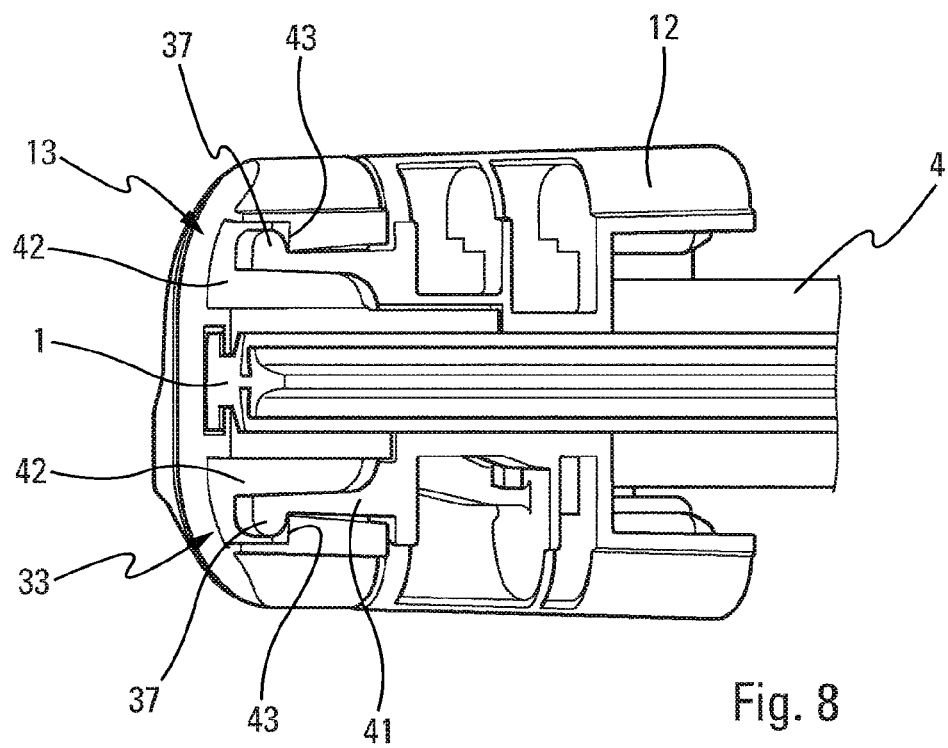
FIG. 8 is a bottom view illustrating the phase of securing the second part in the first part, according to a first variant.

FIG. 8 illustrates a variant embodiment of the removable attachment means 33 between the first part 12 and the second part 13. In this case, the removable means is formed by at least one flexible finger 41 obtained from the first part 12. In this embodiment, the first part 12 comprises two flexible fingers 41. This flexible finger extends on the plane of the support 4 and toward the end of the first part opposite the receptacle 14 which receives the liquid-feeding device. The flexibility of this finger is obtained by the plastic material which constitutes the first part 12, combined with the thickness of this finger which confers flexible properties. The free end of each finger 41 ends in a means for retention 37, which in this case is in the form for example of a half-circle. The second part 13 comprises two end deformations 42, which each receive the flexible finger 41. The form of a half-circle of the means for retention 37 forms a stop and provides blockage of the first part 12 relative to the second part 13, by co-operation between the means for retention 37 and a ridge 43 which delimits each end deformation 42 by forming a shoulder.

Figure 9:
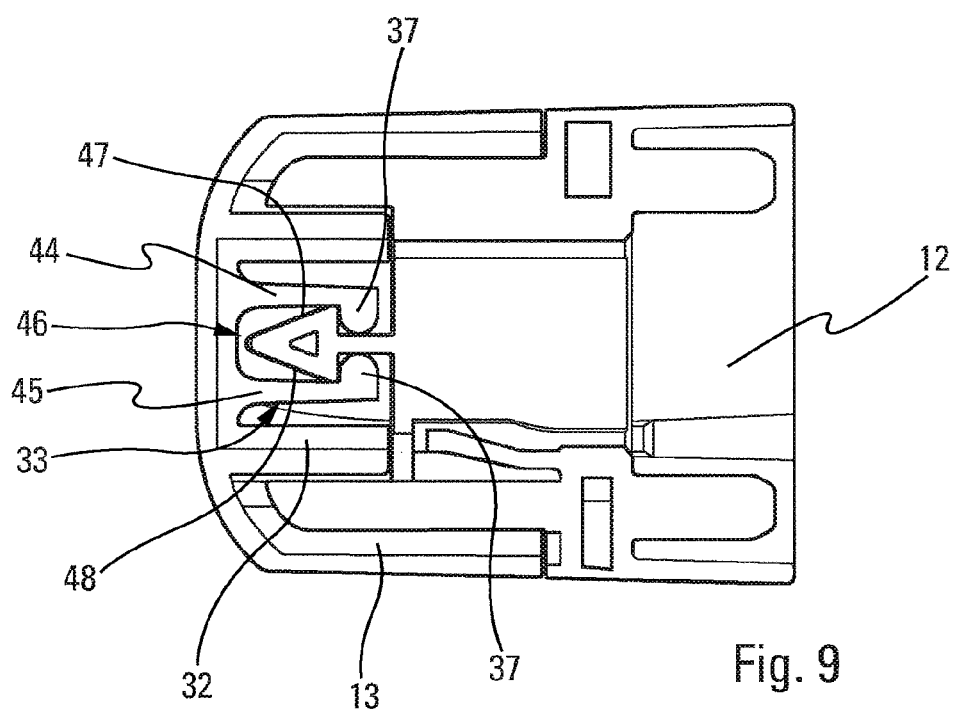
FIG. 9 is a bottom view illustrating a phase of securing the second part in the first part, carried out according to a second variant.

FIG. 9 shows a second variant embodiment of the removable attachment means 33. Whereas, in the variant in FIGS. 5 to 7, the removable attachment means is formed by arms which extend laterally from the body 12, the removable attachment means is in this case included or contained in the width of the body 32. It will thus be understood that the flexible means illustrated in FIG. 9 does not extend laterally from the body 12 according to the plane of the support.

In this case, the removable attachment means 33 comprises two flexible arms 44 and 45, at the end of which there is provided a means for retention 37 which is in the form of a half-circle. The two arms 44 and 45 grip a blocking means 46 formed on the lower wall of the first part 12. This blocking means comprises in particular two oblique facets 47 and 48 which tend to space the flexible arms 44 and 45 from one another during the introduction of the second part 13 in the first part 12.

When the second part 13 is in the position secured on the first part 12, the means for retention 37 are supported against ridges which are adjacent to the oblique facets and delimit the blocking means 46.

In the above-described variants, it will be noted that the first part 12 forms a unit assembly molded from a single plastic material. The same applies for the second part 13, which can be molded such as to form a part in a single piece.

The invention claimed is:

1. A device for securing a blade and a support to form a wiper, the device comprising:
 a first part attached on the support; and
 a second part attached on the blade, the first part and the second part being connected by a removable attachment means, wherein the first part comprises at least one blocking means which can plug at least one liquid-feeding device which the wiper comprises, wherein the second part comprises a body which the blade is threaded into, the removable attachment means being constituted by two flexible arms which originate on the body, and at the end of which a means for retention on the first part is formed, wherein at least one arm has a protuberance which is accommodated in a hole provided in the blade, and wherein the device is positioned between the blade and the support.

2. The device as claimed in claim 1, wherein the blade and the support extend according to a longitudinal axis of the wiper, the liquid-feeding device being constituted by two ducts arranged on both sides of the support.

3. The device as claimed in claim 2, wherein the ducts are formed integrally with an air deflector.

4. The device as claimed in claim 1, wherein the first part comprises a receptacle which receives an end of the liquid-feeding device.

5. The device as claimed in claim 1, wherein the blocking means comprises a stud which penetrates inside the liquid-feeding device in order to plug it.

6. The device as claimed in claim 1, herein the first part comprises a means for locking the first part on the support.

7. The device as claimed in claim 1, wherein the first part comprises two deformations, with which each means for retention co-operates.

8. The device as claimed in claim 1, wherein the removable attachment means is formed by at least one flexible finger which extends from an end of the first pan and co-operates with a ridge provided in the second part.

9. A wiper system comprising:
a blade;
a support; and
a device,
the device further comprising:
a first part attached on the support; and a second part attached on the blade, the first part and the second part being connected by a removable attachment means, wherein the first part comprises at least one blocking means which can plug at least one liquid-feeding device which the wiper comprises, wherein the second part comprises a body which the blade is threaded into, the removable attachment means being constituted by two flexible arms which originate on the body, and at the end of which a means for retention on the first part is formed, wherein at least one arm has a protuberance which is accommodated in a hole provided in the blade, and wherein the blade is secured on the support by the device.

\* \* \* \* \*

UNITED STATES PATENT AND TRADEMARK OFFICE
CERTIFICATE OF CORRECTION

| | | |
|---|---|---|
| PATENT NO. | : 9,598,052 B2 | Page 1 of 1 |
| APPLICATION NO. | : 13/821242 | |
| DATED | : March 21, 2017 | |
| INVENTOR(S) | : Philippe Espinasse | |

It is certified that error appears in the above-identified patent and that said Letters Patent is hereby corrected as shown below:

In the Claims

At Column 7, Claim 6, Line 26, the word "herein" should read -- wherein --.

At Column 8, Claim 8, Line 6, the word "pan" should read -- part --.

Signed and Sealed this
Sixth Day of June, 2017

Michelle K. Lee
*Director of the United States Patent and Trademark Office*